United States Patent [19]

Vogt et al.

[11] Patent Number: 5,044,642
[45] Date of Patent: Sep. 3, 1991

[54] ANNULAR SEAL

[75] Inventors: Rolf Vogt, Oftersheim; Karl H. Spies, Birkenau; Gerhard Kilthau, Mannheim, all of Fed. Rep. of Germany

[73] Assignee: Firma Carl Freudenberg, Weinheim, Fed. Rep. of Germany

[21] Appl. No.: 576,142

[22] Filed: Aug. 29, 1990

Related U.S. Application Data

[63] Continuation of Ser. No. 308,436, Feb. 9, 1989, abandoned.

[30] Foreign Application Priority Data

Mar. 30, 1988 [DE] Fed. Rep. of Germany ....... 3810741

[51] Int. Cl.⁵ .............................................. F16J 15/54
[52] U.S. Cl. .................... 277/134; 277/133; 277/153
[58] Field of Search ......................................... 277/153

[56] References Cited

U.S. PATENT DOCUMENTS 2,577,818 12/1951 Shaw ..................................... 51/290
3,572,730 3/1971 Otto ..................................... 277/134
3,586,340 6/1971 Otto ..................................... 277/134
4,441,349 4/1984 Symons ................................. 51/332
4,568,092 2/1986 Hayashida et al. .................. 277/134
4,573,690 3/1989 DeHart et al. ...................... 277/134

FOREIGN PATENT DOCUMENTS 2108341 10/1972 Fed. Rep. of Germany .
3418738 11/1985 Fed. Rep. of Germany ...... 277/134
976169 1/1982 U.S.S.R. ............................. 277/134

Primary Examiner—Allan N. Shoap
Assistant Examiner—Daniel G. DePumpo
Attorney, Agent, or Firm—Felfe & Lynch

[57] ABSTRACT

An annular seal in which a sealing lip of polymeric material is urged under resilient bias against a cylindrical surface of a shaft. The cylindrical surface is provided with saucer-like indentations. The maximum depth of the indentations amounts to 4 to 12 micrometers, and each indentation is surrounded on its entire periphery by adjacent indentations. The distance between centers of the indentations is so small that the adjacent indentations merge with one another to form arrises.

3 Claims, 2 Drawing Sheets

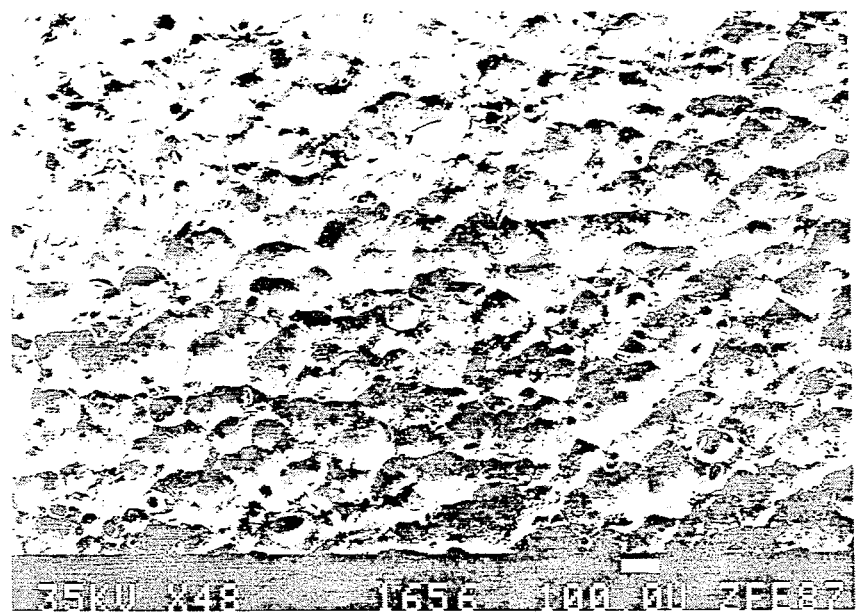
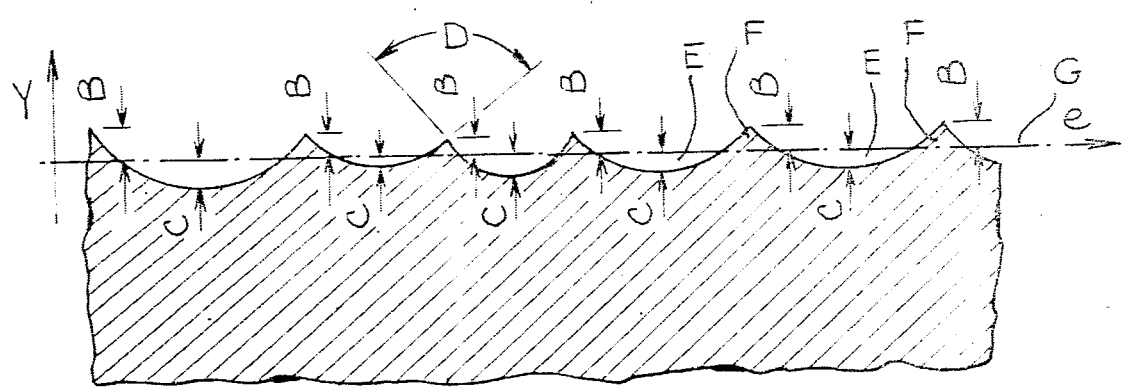
$$\int_0^l |y| \cdot dl = \Delta y \cdot l$$

ANNULAR SEAL

This application is a continuation of application Ser. No. 308,436, filed Feb. 9, 1989, now abandoned.

BACKGROUND OF THE INVENTION

The invention relates to an annular seal which has a cylindrical surface of the outside diameter DA and containing indentations, and which has a sealing lip of annular configuration made from polymeric material which is urged under resilient bias against the cylindrical surface.

An annular seal of this general kind is known. The cylindrical surface engaged by the sealing lip has indentations provided in it, which consist of grooves or ridges running parallel to one another. These grooves or ridges are formed when the cylinder surface is finished—when it is ground, for example—and can have an effect on the sealing action of the annular seal. This is especially true when the annular seal is used in connection with the sealing of a relatively rotating machine part, such as a shaft. Then, as a result of hydrodynamic effects known in themselves, axial pumping action occurs within the seal interstice, resulting in either an impairment or an improvement of the sealing action. In general it is an improvement of the sealing action that is desired. Consequently attempts have been made to establish the inclination of the individual grooves or ridges with respect to the axis of the cylindrical surface such that, in proper use, a pumping action directed towards the area to be sealed is produced in the interstice. However, this pumping action becomes increasingly apparent with increasing shaft speed, and, at very high shaft speeds, the result may be that too little of the medium being sealed remains in the gap to provide for the lubrication and cooling of the sealing lip. Premature failure of the seal is the necessary consequence.

DE-OS 21 08 341 discloses a method for the surface treatment of metallic friction surfaces, in which the friction surfaces which cooperate in their proper use are peened in whole or in part by blasting with glass beads after they are superfinished, in order to achieve a surface texture allowing good adhesion of an oil film on these surfaces while they are being run in or thereafter. The acceptable speeds in frictional engagement can thus be increased, and the saucer-like indentations produced by the glass beads can be so close together that they touch or overlap. The use of glass bead peening in connection with the production of seals is not suggested in the above-cited patent application.

It is the purpose of the invention to develop an annular seal for use in conjunction with shafts, which will be distinguished from those heretofore known by a substantially improved useful life at very high frictional speeds of more than 20 meters per second.

SUMMARY OF THE INVENTION

In the annular seal in accordance with the invention, the indentations are saucer-like depressions of a maximum depth of 4 to 12 micrometers below the outside diameter of the cylindrical surface, each indentation being surrounded on its entire outside circumference by the adjacent indentations, and the distances between centers of adjacent indentations are such that they merge with one another to form arrises. The distances between centers of the most closely adjoining indentations are slight and, statistically considered, do not exceed an average of 0.1 mm. Surprisingly, an excellent sealing action is thereby achieved, both when the shaft is at rest and when it is rotating. Even at very high shaft speeds, there is no need to fear that the seal will "run dry," and the larger area of contact with the cylinder surface creates decidedly improved conditions with regard to the dissipation of heat. The useful life of the seal is thus substantially improved.

The indentations have a maximum depth of 4 to 12 micrometers below the outside diameter DA. In conjunction with the polymeric materials commonly used in making sealing lips, a good sealing action is achieved, especially in the indented area. The material of the seal can be especially PTFE and polyamide, in addition to various other elastomeric materials.

In accordance with an advantageous embodiment, provision is made such that the indentations constantly succeeding one another in any direction on the cylindrical surface together form a profile which, with reference to an imaginary center line, contains positive and negative differences which, taken as a whole, are of the same magnitude, while the integrated maximum departures of the deepest and highest points of all indentations from the center line are less than 1.5 micrometers, advantageously less than 1.0 micrometer. Statistically considered, such a profile is distinguished by an extraordinarily great uniformity. Both when the shaft is at rest and when it is rotating, this results in an especially good sealing action.

The indentations can include those of different radii of curvature, for this has proven to be especially advantageous toward the avoidance of undesired pumping effects. Their profiles can best meet one another at their intersections so as to form angles of 90 to 135 degrees.

The individual indentations are best randomly distributed over the cylindrical surface, i.e., they are best in a random relationship to one another. The circumferential relative movement between the sealing lip and the shaft which is produced by the rotation of the shaft, results in a drag flow within the interstice of the seal, whose direction constantly changes at the intersectional ridges over which it passes, causing an intense agitation of the medium being sealed which is contained in the indentations. Frictionally caused overheating of the medium is thereby reliably prevented.

The indentations can be produced in the cylindrical surface by shot-peening with glass or steel beads. This at the same time produces a work-hardening of the surface which markedly improves its mechanical durability. Shot-peening of this kind can be performed in an especially economical manner, and therefore it can be employed easily in large-series production.

It is furthermore an important advantage that such shot-peening of the cylindrical surface can eliminate any superficial irregularities, such as scratches made during previous machining or grinding operations. Shot-peening is therefore recommended, for example, as an especially economical treatment for previously superfinished surfaces or shafts or for the surfaces of deep-drawn rings of cassette seals. The axial width of surfaces produced in this manner need not appreciably exceed the width of the track on which the sealing lip of polymeric material runs. In general, an axial width will suffice which extends about 1.5 mm beyond both sides of the axial contact surface of the sealing lip. A non-directional wettability results within the treated surface.

The cylindrical surface of the annular seal provided with the saucer-like indentations in accordance with the invention is distinguished also by great insensitivity to damage. Even deep scratches which, in the case of the known annular seals with a smooth cylindrical surface, result in immediate leakage do not lead to any marked variation of the sealing action in the case of the construction according to the invention. The finished cylindrical surfaces of the annular seal in accordance with the invention do not need an special protection during the storage and transport of the parts of the seal. This permits substantial cost savings.

In accordance with the invention, an annular seal comprises an inner cylindrical surface with the outside diameter DA and indentations made therein. The seal includes a sealing lip of polymeric material and of annular configuration pressed with resilient bias against the cylindrical surface. The indentations have saucer-like bottoms having centers and having a maximum depth of 4 to 12 micrometers, with respect to the diameter DA. Essentially each bottom is surrounded at its entire outer periphery by the bottoms of adjacent indentations. The distances between the centers of the bottoms of the adjacent indentations are so small that the bottoms of the adjacent indentations adjoin one another at arrises.

For a better understanding of the invention, together with other and further objects thereof, reference is made to the following description, taken in connection with the accompanying drawings, and its scope will be pointed out in the appended claims.

BRIEF DESCRIPTION OF THE DRAWINGS

Referring now to the drawings:

FIG. 3 is a photomicrograph of a cylindrical surface of the annular seal in accordance with the invention; and FIG. 4 is an enlarged sectional view of a profile of a cylindrical surface of the annular seal in accordance with the invention, in which the details are shown greatly enlarged for the sake of easier comprehension.

DESCRIPTION OF A PREFERRED EMBODIMENT

Figure 1:
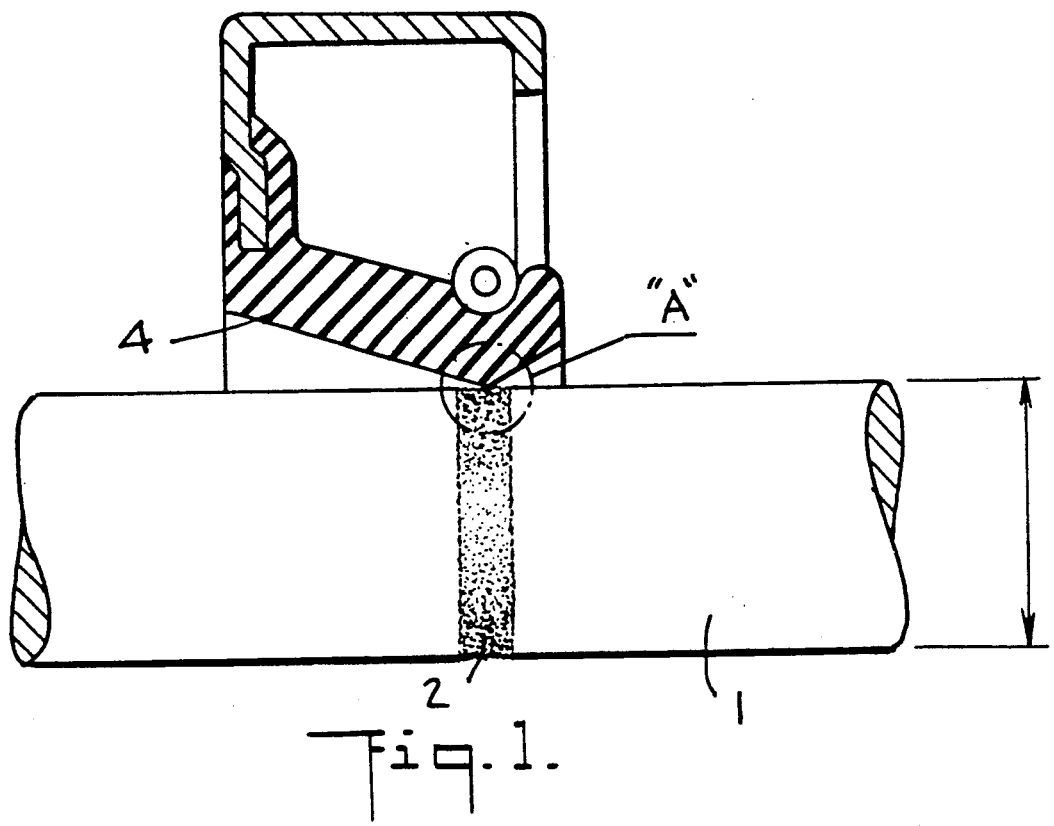
FIG. 1 represents in a partly sectional side view half of an annular seal of the kind in accordance with the invention.

The annular seal shown in FIG. 1 includes a radial shaft sealing ring of conventional construction, which is shown as properly employed, and which contacts the shaft with the sealing edge of its lip 4. The sealing edge is urged by the force of an annular coil spring stretched over its outer side against the surface of the shaft 1 that is to be sealed. This shaft has the outside diameter DA.

Figure 2:
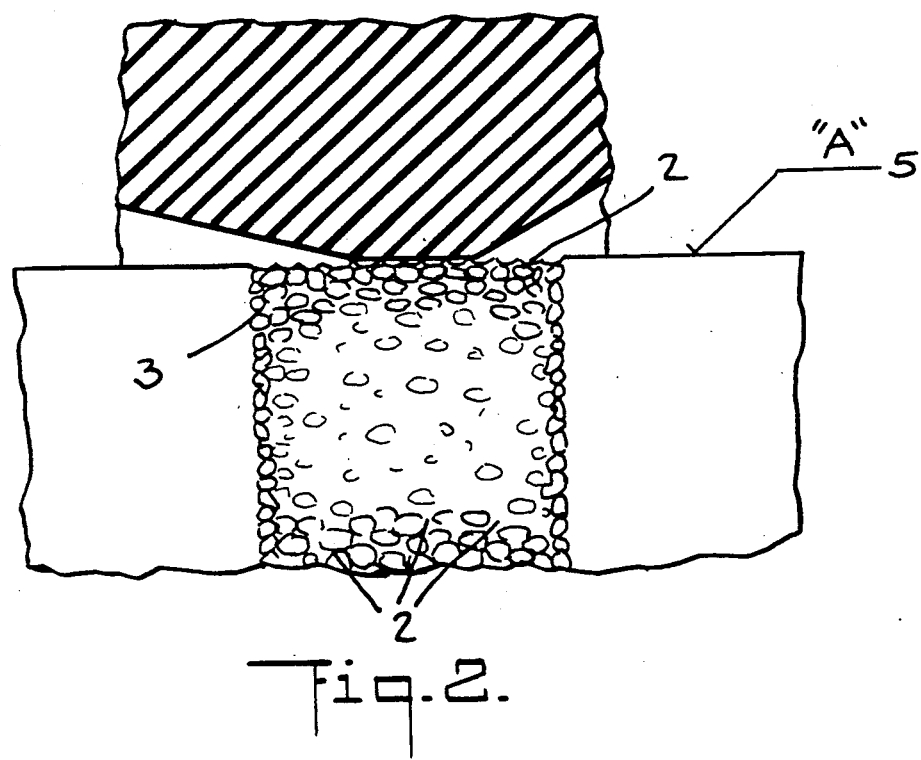
FIG. 2 is an enlarged detailed partly sectional side view of the annular seal shown in FIG. 1.

In the area of its contact with the sealing edge, the cylindrical surface is provided with indentations 1 having saucer-like bottoms 2. The depth below DA of these indentations amounts to 4 to 6 micrometers, each indentation being surrounded by adjacent indentations, while the bottoms 2 of the adjacent indentations merge with one another at the arrises 3. The area of contact between the sealing edge and the cylindrical surface of the shaft is represented in FIG. 2. This figure shows that the sealing edge of the sealing lip 4 preferably consisting of polymeric material, which is to a certain extent flattened by the pressure of the annular coil spring, confronts the arrises 3 of the adjoining indentations in the cylindrical surface 5. Under normal operating conditions, i.e., in regard to the sealing of a liquid medium, the indentations are filled with this medium. When the shaft is rotating, this obviously causes the sealing lip 4 to be lifted slightly away from the cylindrical surface 5 and at the same time causes the medium to be agitated in the indentations and in the interstice of the seal. No lubrication problems of any kind occur even at extremely high rotatory speeds.

FIG. 3 represents an enlargement of an example of a cylindrical surface ready for use. It can easily be seen that the indentations have saucer-like bottoms and that they are surrounded on their entire periphery by adjacent indentations, and that the indentations merge with one another to form arrises. The result is a completely irregular surface texture. And yet, when a cylindrical surface configured in this manner is used, an excellent sealing action is achieved both when the shaft is at rest and when it is rotating.

FIG. 4 presents an exemplary relief of a cylindrical surface of the annular seal in accordance with the invention, ready for use. It can be seen that the succeeding indentations overall have a profile containing positive and negative differences on either side of an imaginary center line G, which, taken as a whole, are of the same magnitude, while the integrated maximum deviations of the deepest and highest points of all indentations from the center line are smaller than 1.0 micrometer.

This may be expressed mathematically as:

$$\delta \int_0^l |Y| \cdot dl = \Delta Yl$$

where Y is the dimension perpendicular to the imaginary center line and l is the length along the imaginary center line.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. An annular seal, comprising:
   a cylindrical surface having an outside diameter DA with indentations made therein and defined between opposed axially spaced boundaries on said surface;
   a sealing lip of polymeric material and of annular configuration pressed with resilient bias against the cylindrical surface;
   said indentations having saucer-like bottoms having centers and having a maximum depth of 4 to 12 micrometers, with respect to said diameter DA;
   each bottom being surrounded at its entire outer periphery by adjacent indentations except at said boundaries;
   the distances between said centers of said bottoms of said adjacent indentations being so small that said bottoms of said adjacent indentations adjoin one another at arrises;
   the maximum relative frictional speed of the annular seal against the cylindrical surface being more than 20 meters per second.

2. An annular seal in accordance with claim 1, in which all said bottoms include those with different radii of curvature from one another.

3. An annular seal in accordance with claim 1, in which all said bottoms intersect one another at said arrises substantially at an angle D of 90 to 135 degrees.

* * * * *